Dec. 20, 1955     L. GRILLET ET AL     2,727,502
INTERNAL COMBUSTION MOTORS

Filed Jan. 14, 1953     5 Sheets-Sheet 1

Dec. 20, 1955  L. GRILLET ET AL  2,727,502
INTERNAL COMBUSTION MOTORS
Filed Jan. 14, 1953  5 Sheets-Sheet 2
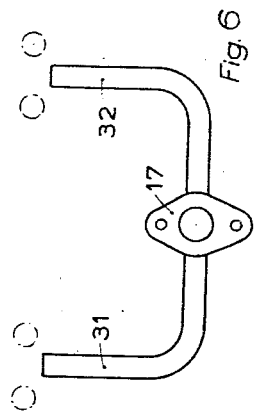
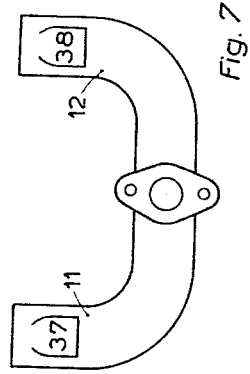
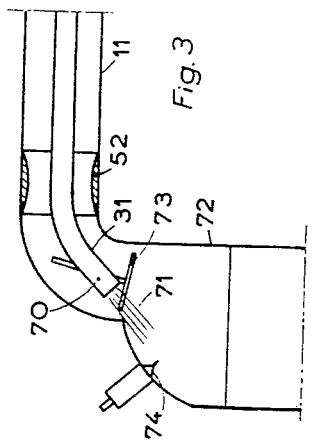
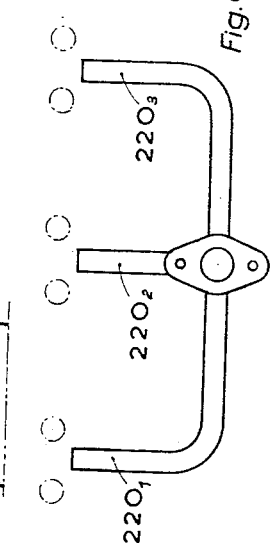
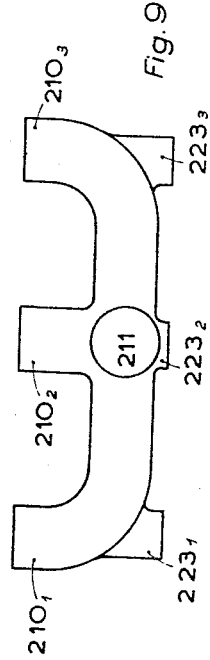
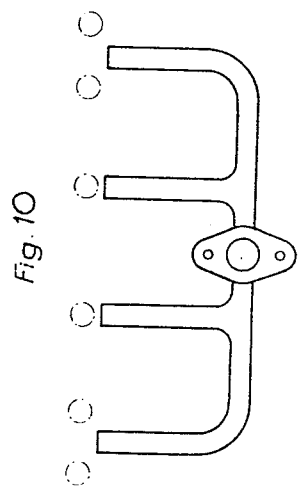

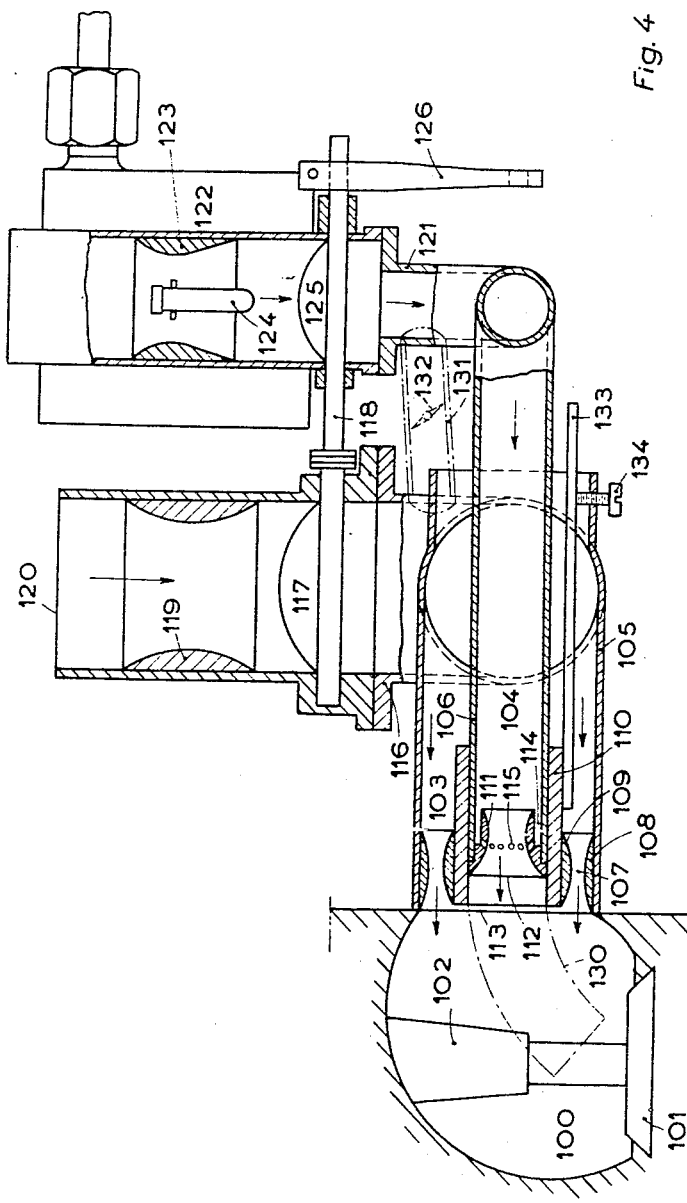

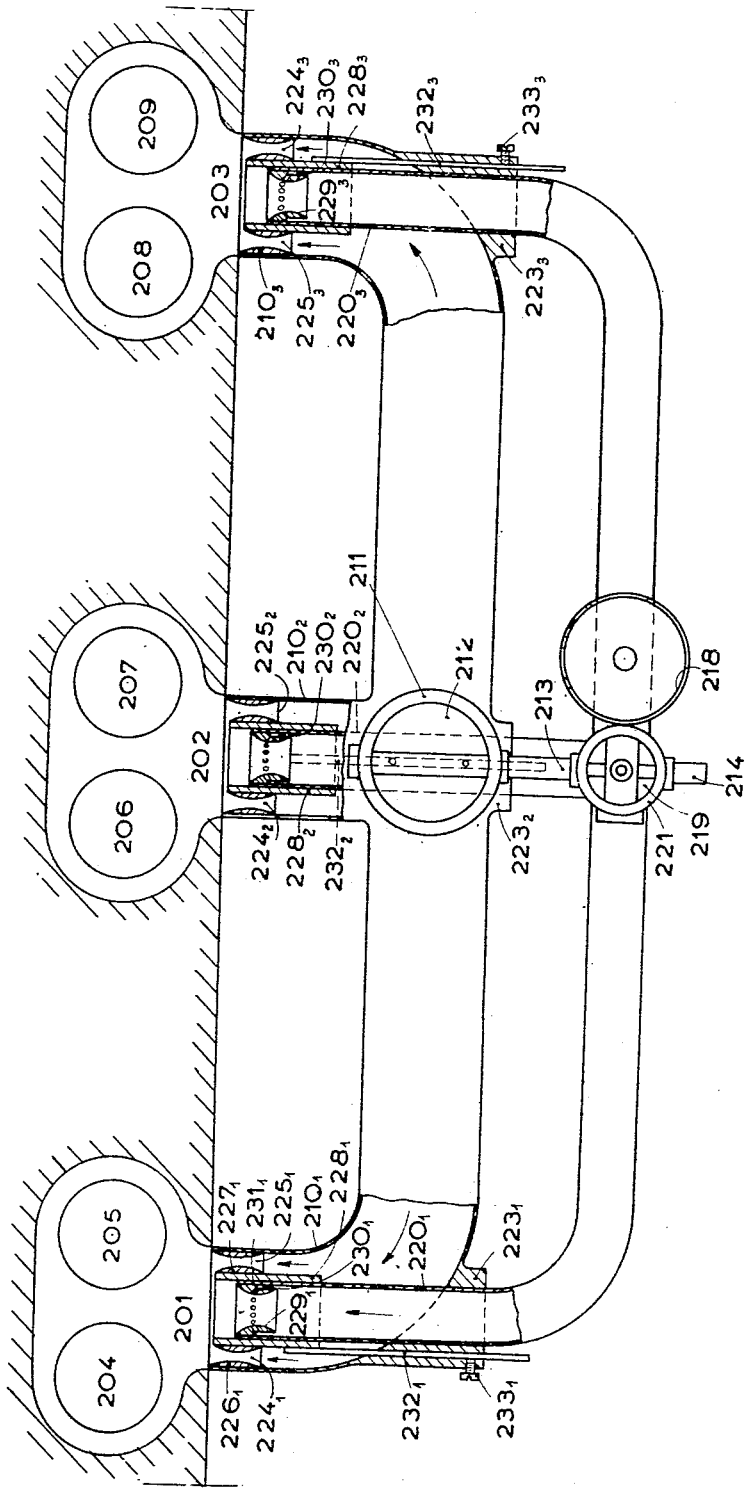

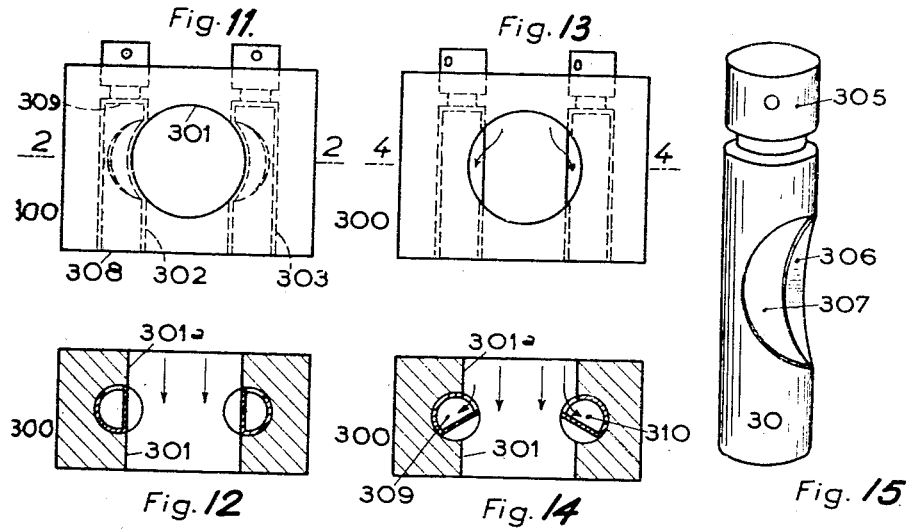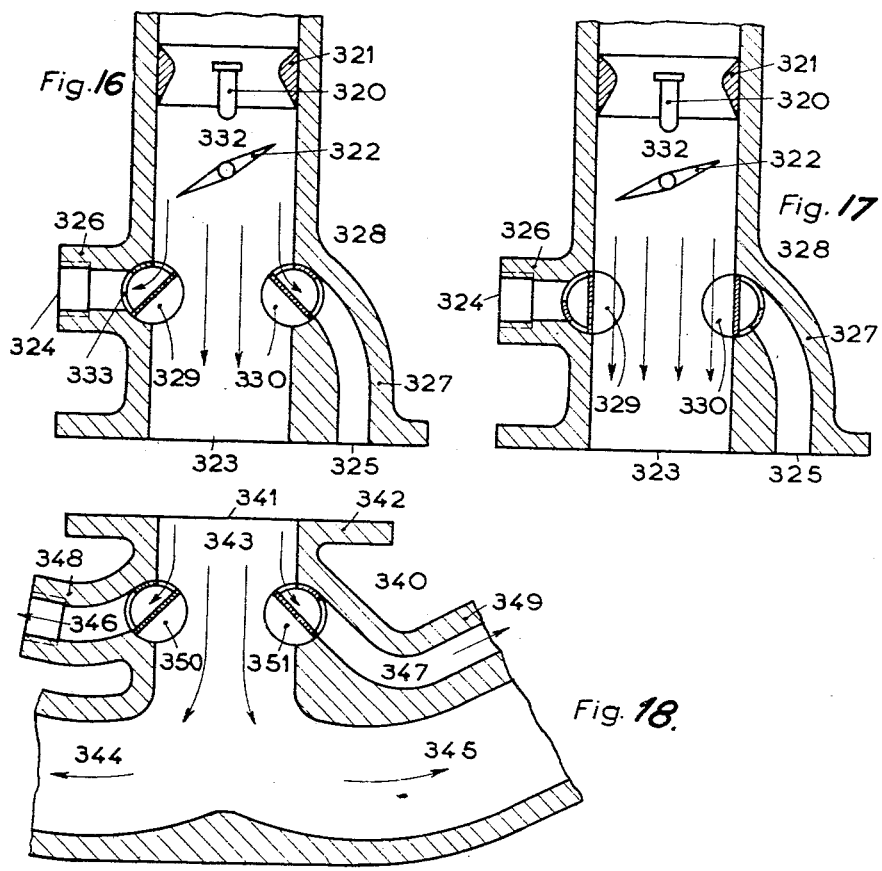

United States Patent Office 2,727,502
Patented Dec. 20, 1955

2,727,502

INTERNAL COMBUSTION MOTORS

Lucien Grillet, Paris, and Henri Regnault, Boulogne-sur-Seine, France

Application January 14, 1953, Serial No. 331,164

Claims priority, application France July 18, 1952

11 Claims. (Cl. 123—122)

This invention relates to improvements in internal combustion motors. Many attempts have been made to improve the efficiency of operation of such motors by the use of devices adapted to feed the carburized gas mixture to the motor cylinders under more favorable conditions than those prevailing where conventional carburettors are used. The fact remains, nevertheless, that none of the great variety of carburizing devices designed and tested in recent years has met with a full measure of success, and it may be said that the supply of the carburized fuel mixture to the motor cylinders in present day motors is accomplished under conditions very similar—except for minor details—to those which were present years and years ago.

Another widely recognized fact is that, despite the considerable amount of research carried out in connection with internal combustion motors, the efficiency ratio therein remains comparatively very low; in other words, only a very small fraction of the thermal energy content in the fuel is converted into useful power.

An object of our invention is to provide a carburizing device adapted for use in conjunction with an internal combustion or explosion motor and effective to increase the efficiency ratio thereof beyond the values attainable heretofore, all other factors remaining the same.

A more specific object is to provide means for imparting to an internal combustion motor having a given cylinder capacity a power output higher than that of a motor of equal cylinder capacity not provided with said means.

It is another object to provide means for reducing the specific fuel consumption of an internal combustion motor.

A further object is to provide a device whereby a given fuel may be utilized in an internal combustion motor under higher pressure conditions than those heretofore attainable, without incurring the danger of spontaneous ignition conducive to detonation or "knock."

It is moreover a general object of our invention to provide an internal combustion motor having a higher efficiency ratio than that of conventional motors.

A further object is to provide a motor wherein the operating temperature, as considered in its external effects, will remain comparatively low, even with the motor operated at its highest outputs.

An object of the invention is to provide a motor wherein the operating temperature may be controlled to an optimum value in a simple manner.

An object is to provide an internal combustion motor wherein the cooling means, such as the radiator, may be designed as a more simple, less bulky and more lightweight unit than in conventional motors.

An object is to provide an internal combustion motor wherein the lubrification will be more efficient and which will consume less lubricant than conventional motors.

An object is to provide a motor in which ignition will always be effected successfully even after the motor has been running for a prolonged period of time at high output.

Another object is to provide a device quickly and easily adaptable to existing motors of the type specified in order to impart to the motor the above-listed desirable operating characteristics.

It is an object to provide such a device which will be simple and economical to manufacture.

It is another object of this invention to provide a fuel supply device for internal combustion motors, wherein the fluid temperature will at any time remain at its most favourable value despite varying output and operating conditions of the motor.

It is a further object of the invention to provide means for imparting at any time to a given motor its optimum efficiency ratio, thereby reducing the consumption of fuel.

It is also an object to provide such means whereby the circulation of the gases will be effected in the best possible way at various adjusted settings.

It is an object to provide a carburetor comprising as an integral part thereof means for reaching the above results.

A general object is to provide an internal combustion motor applicable with particular advantage to the propulsion of land, water and air vehicles and craft.

In conventional internal combustion engines, the carburetor is generally located in the vincinity of the motor, so that the high temperature developed by the latter in operation will contribute heat to vaporize the fuel more efficiently. However, the carburized gas reaching the motor, particularly after the motor has operated for some time, is at such a high temperature that the thermal power output of each cylinder will be substantially reduced, thereby correspondingly affecting the power output of the motor.

If it is attempted to overcome this difficulty by locating the carburetor at a point remote from the motor so that it will not be substantially affected by the temperature of the motor, it is found that under many operating conditions the fuel is inadequately vaporized, and the explosive mixture fed to the motor will contain fuel partly in the liquid state, a condition which results in even poorer operation than in the previously mentioned instance.

While many attempts have been made in order to strike a balance between these conflicting conditions, no satisfactory solution has as yet been evolved, especially when consideration is given to the unavoidable variations in fuel composition, ambient temperature, vehicle speed, and other factors.

The improvement provided by the invention makes it possible to supply the motor with a carburized mixture in which the fuel is wholly in the gaseous state and which, nevertheless, is supplied to the motor at the optimum temperature for ensuring proper operation of the motor, which temperature can be made practically as low as desired.

According to the invention, there is added to a fluid supplied to the motor in the conventional manner, i. e. through an intake manifold which communicates thermally with the motor, and especially with the exhaust pipe thereof, a carburized gas wherein the fuel has been gasified, essentially, by pneumatical means exclusively, i. e. suction and/or over-pressure, and hence substantially without having received any external heat, so that the additional gaseous flow, which is cooled owing to the vaporization of the volatile liquid, lowers the temperature of the gases drawn into the motor. The motor is thus supplied with a mixture of accurately controlled composition, fully in the gaseous state, and at an optimum temperature.

In one form of embodiment of the invention, the fluid circulating in the intake pipe, thermally communicating with the motor, is a carburized mixture wherein a complete vaporization of the fuel is obtained by deflection onto a heated dished portion, in a manner known per se, the complementary flow, also carburized, bringing the gases drawn into the motor cylinder to their optimum temperature value.

According to another form of embodiment, all of the fuel fed to the cylinder is conveyed thereto in the complementary flow, the usual induction pipe serving in this case exclusively for the flow of air, which is thus heated due to the circulation thereof in the pipe. This embodiment is especially desirable in the case of motors intended to be operated at outputs resulting in high temperature elevations.

In a modification of the last described form of the invention, this desired result is achieved by providing a pneumatic communication from the air flow circuit to the carburized gas flow circuit, means being provided for cutting off said circulation and/or adjusting the rate of flow thereof.

Further according to a feature of the invention, the carburized gas flow is introduced into the cylinder in the form of a jet in a predetermined direction effective to fill the cylinder to capacity.

According to another feature, this direction is moreover so predetermined that the ignition means such as the spark plug will be swept by said jet and thereby held to a comparatively low temperature to ensure satisfactory ignition conditions.

According to a preferred form of construction, the means for circulating the complementary flow are such that the rate of flow thereof will be higher than the rate of flow in the main flow circuit.

The said means may, according to the invention, be provided by the suction and over-pressure generated by the circulation in the main flow circuit, as by venturi effect or the like, as well as a suitable design of the circuit provided for the said additional flow.

According to an important feature of the invention, the said circuit provided for the additional flow comprises pipe means provided with a highly smooth internal surface, this surface condition being enhancing effective vaporization of the fuel. Such a pipe may be constructed easily and economically owing to the more or less complete thermal isolation thereof from the exhaust of the motor.

The invention will be fully understood from the ensuing description which relates to some exemplary forms of embodiment thereof selected by way of illustration and not of limitation. Reference will be had to the accompanying drawings wherein:

Fig. 3 is a diagrammatic view of the supply of fuel to one cylinder;

Fig. 4 is a view in vertical section of a supply device in another form of the invention;

Fig. 5 is a plan view partly in section of an arrangement for supplying fuel to a six cylinder motor;

Fig. 6 illustrates diagrammatically in plan a separate conduit attachment according to the invention for converting a four cylinder motor;

Fig. 7 is a plan view of an intake pipe for the conversion of such a motor;

Fig. 8 is a view similar to Fig. 6, but relating to a six cylinder motor;

Fig. 9 is a view similar to Fig. 7, but relating to a six cylinder motor;

Fig. 10 is a view similar to Figs. 6 and 8 relating to a modification of the invention;

Fig. 11 is a plan view of a device for attachment to a carburetor;

Fig. 12 is a section on line 12—12 of Fig. 11;

Fig. 13 is a view similar to Fig. 11 in a different setting;

Fig. 14 is a section on line 14—14 of Fig. 13;

Fig. 15 is a perspective illustration of a valve member;

Fig. 16 is a sectional view of an improved carburetor;

Fig. 17 is a view similar to Fig. 16 for a different setting;

Fig. 18 is a sectional view showing an improved admission pipe.

Figure 1:
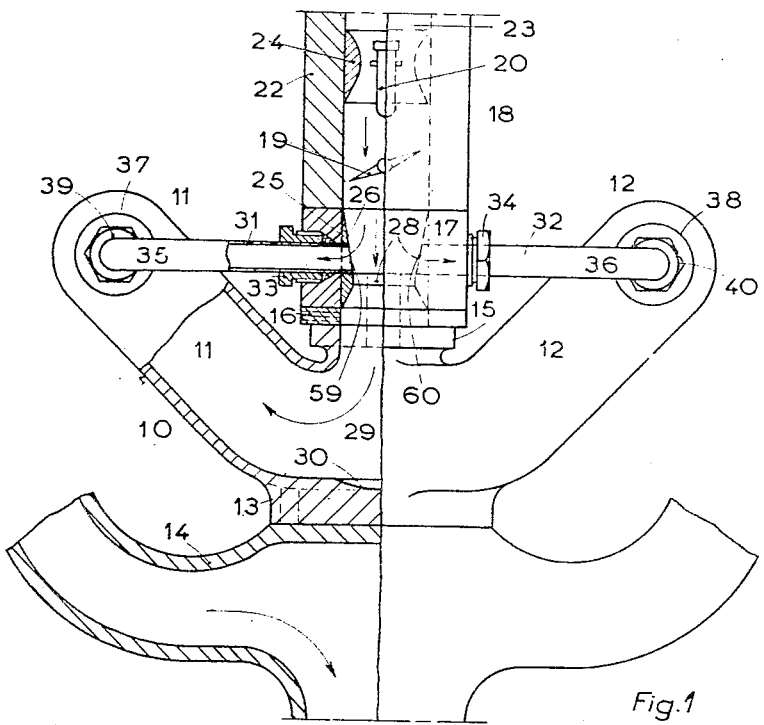
Fig. 1 is a view in elevation, partly in section, of one form of construction.
Figure 2:
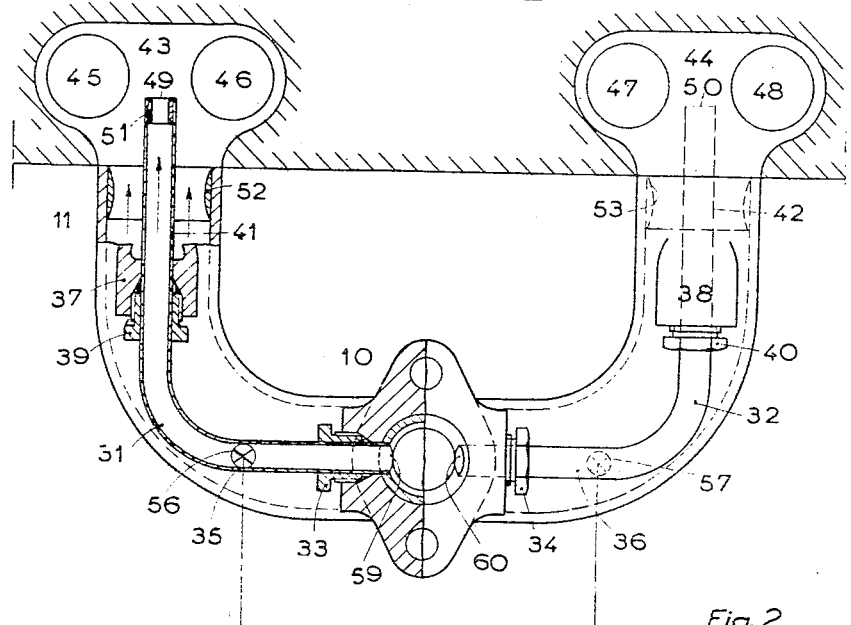
Fig. 2 is a corresponding view in plan, partly in section.

Reference is first made to Figs. 1 and 2. A conventional intake manifold or pipe 10 comprises two branches 11 and 12 and is secured to the motor and more specifically to the exhaust pipe 14 thereof in a well known manner as by the connecting section 13.

Secured through an isolating plate 16 to a flange 15 serving for attachment of the carburetor, is a block 17 having mounted thereon a conventional carburetor 18. The carburetor 18 is provided with the throttle valve member 19, and the fuel intake jet 20 mounted in the restricted throat section 23 of a venturi 24 mounted within a conduit 22.

The block member 17 is formed with a conduit 25 aligned with the conduit 22 and having mounted therein a further venturi member 26 provided with a restricted throat section 28. The conduit 25 opens with its outer end into the interior space 29 of intake manifold 10. The opposite end surface of the intake manifold is preferably dished as at 30 adjacent the exhaust pipe 14 in a conventional manner.

Opening into the conduit 25, slightly upstream with respect to throat section 28 in the exemplary embodiment shown, are two conduits 31 and 32 desirably having highly polished internal surfaces, and sealingly secured to the block 17 as by the perforated connector screw members 33 and 34. The conduits 31, 32, as more clearly visible from Fig. 1, have initial portions 35, 36 extending outside the intake pipe 10, and thereafter penetrate into the pipe 10 through suitable bosses 37 and 38 fitted with screw connectors 39 and 40 providing a tight seal at the points of penetration. Thus, it will be understood that the pipes 31 and 32 in outer portions 41 and 42 of the lengths thereof extend into and through the branches 11 and 12 of the intake pipe. The intake pipe branches 11 and 12 have venturi members 52 and 53 fitted into the respective outer ends thereof and open into the usual intake chambers 43 and 44 containing, in the exemplary, four-cylinder construction shown, the four intake valves 45 to 48. As shown, the pipes 35 and 36 extend with their outer ends a certain distance into the said chambers 43 and 44 respectively. The extremities 49 and 50, respectively, of the pipes 35 and 36 are located substantially at equal distances from the related intake valves 45 and 46, and 47 and 48, and are adjacent thereto, as clearly shown on Fig. 2. It will be understood however that the outlet orifices of the pipes 35 and 36 may be arranged nearer to the apertures of the respective intake chambers 43 and 44 than the distance shown, or they may be located outside said chambers within the pipe branches 11 and 12. As shown in connection with the left hand pipe 31 in Fig. 2, the terminal part 51 thereof may be provided with means for restricting the inner cross sectional area thereof.

Angularly adjustable valve means 56 and 57 are preferably provided within the pipes 35 and 36 as illustrated, said valves being operable from the control panel of the vehicle through any suitable transmission schematically indicated at 58.

The arrangement described operates as follows:

With the motor in operation a suction is generated which is communicated to the carburetor 18. Air is drawn in through the air intake aperture of the carburetor and said air flows through the conduit 22 and as it passes the jet 20 draws partially vaporized fuel with it. Part of the carburized mixture thus produced enters in the conventional manner into the intake pipe 10 and the non vaporized liquid droplets of the fuel carried with the mixture impinge on the heated dished portion 30 therein and vaporize. The carburized mixture flows through the branches 11 and 12 which are heated to a relatively high temperature owing to their contact with the exhaust pipe 14 and enter the intake chambers 43, 44 of the motor.

The gas flow in branches 11 and 12 and in the chambers 43 and 44 generates suction at the outlets 49 and 50 of pipes 31 and 32 which suction is communicated to the inlets 59 and 60 of said pipes where the latter connect with the block 17. Moreover owing to the overpressure developed within inlets 59 and 60 by the presence of the restricted section 28, part of the gas flow in block 17 is caused to enter the pipes 31 and 32 and is conveyed thereby into intake chambers 43 and 44. The amount of carburized gas mixture thus withdrawn from the conventional flow circuit will depend on the relative values of the cross sectional areas of restriction 28, conduits 31 and 32 and of outlets 49 and 50, as well as on the arrangement of said orifices and of venturis 52 and 53. The flow velocity in the conduits 31 and 32, which have a comparatively small cross sectional area, is higher than the flow velocity of the gas in branches 11 and 12. The droplets of liquid fuel passing through inlets 59 and 60 are vaporized during this high-velocity flow thereof in pipes 31 and 32. This vaporization results in a temperature drop which is not compensated by heat supplied from the motor owing to the comparatively isolated condition of said pipes from the exhaust manifold 14.

Consequently, the chambers 43 and 44 are supplied on the one hand with carburized gas through the branches 11 and 12, which gas is, in the conventional way, at a comparatively high temperature; and on the other hand with carburized fuel through the pipes 31 and 32, which will be at a substantially lower temperature. Within the carburized flow mixture conveyed through the conventional intake pipe, the fuel is perfectly vaporized owing to the comparatively high temperature prevailing in said intake pipe. Within the carburized fuel mixture conveyed through the pipes 31 and 32, the fuel is also perfectly vaporized owing to the high flow velocity therein, even though said pipes are not at elevated temperature.

Thus, the motor cylinders are supplied, during the intake periods of the operating cycle, with a fuel mixture in which the fuel is completely vaporized and which nevertheless is at a comparatively low temperature, and this temperature may be controlled by controlling the relative amounts of flow through the pipes 31 and 32 with respect to the amount flowing through the intake pipes 11 and 12, as by manual or automatic adjustment of the shell-valves 56, 57 and 58 shown. It will be understood that the valves may, if preferred, be replaced by a single valve located at the restricted section 28.

Fig. 3 illustrates a particularly desirable arrangement for the outlet orifice of either of the pipes 31, 32. In this arrangement, the end portion 70 of the pipe 31 is so conformed that the gas jet, indicated at 71, which enters the motor cylinder 72 during the open periods of intake valve 73, will sweep past the electrode points 74 of the spark plug, thereby effectively cooling the latter. Moreover, the process of filling the cylinder, supplemented by the gas supplied through the pipe 11, is very effectively accomplished with a mixture at an optimum temperature, so that an engine of given cylinder capacity will yield a greater output than hitherto attainable.

Furthermore, the fact that the intake mixture is cool or relatively cool, will eliminate the presence of "hot spots" or local temperature elevation in the cylinder, thereby eliminating spontaneous ignition and consequent detonation or knock.

A motor according to the teachings of the invention may be so designed as to have a comparatively very high compression ratio with the attendant advantages thereof, while retaining excellent operating characteristics.

Reference will now be made to Fig. 4, which relates to another form of embodiment of the invention. Opening into the admission chamber 100 of a motor cylinder provided with the intake valve 101, having a valve stem slidably mounted in a guide 102, are two conduits respectively adapted to have air and carburized gas flowing therethrough.

In this construction, the air is supplied through an annular space 103 and the carburized mixture is supplied through an axial duct 104. The annular space 103 is defined between the intake manifold 105 secured to the motor, generally to the exhaust pipe thereof, and a central conduit 106. The outlet section of annular gap 103 comprises an annular venturi arrangement having the restricted throat section 107 and defined between a radially outer member 108 secured to the pipe 105 and a radially inner member 109 secured to the pipe 106. In the exemplary construction shown, the venturi member 109 is secured to a bushing 110 slidably mounted about the pipe 106, which bushing has a link 133 extending from it and adapted to cooperate with a set screw 134.

Pipe 106 is internally provided adjacent its outer end with a venturi member 111 having its outlet section 112 spaced somewhat in inward of the outlet section 113 of the pipe. The venturi 111 is so formed, as clearly shown in the figure, that the inward portion thereof defines an annular gap 114 with the inner surface of pipe 106 and an annular set of ports such as 115 are provided for connecting said annular gap with the interior of the venturi, the ports being directed at an angle as illustrated.

Opening into the annular gap 103 is a conduit 116—of which the pipe 105 may be considered as constituting an extension—controlled by a throttle valve 117 secured on a shaft 118. The pipe or conduit 116 is fitted, upstream with respect to the throttle valve, with a venturi 119. The orifice 120 of the pipe connects with the free atmosphere.

Pipe 106 has a conduit 121 connected with it, constituting the outlet from a carburetor 122 provided with a venturi 123 having a fuel inlet jet 124 opening into the throat section thereof.

The carburetor throttle is shown at 125 and is secured on the shaft 118. Shaft 118 may be rotated through a lever arm 126.

This embodiment of the invention operates as follows:
When the motor is operating, suction is created in chamber 100 at each induction period, causing air to flow through the annular space 103 from conduit 116 and air inlet 120, the rate of flow of the air thus drawn in being controllable by actuation of throttle valve 117, and its flow velocity depending on the relation between the various cross sectional areas in the flow circuit. Flowing through conduit 104 is carburized mixture from carburetor 122. Since neither the carburetor nor the conduit 121 and pipe 106 extending the latter are secured directly to the motor, the carburized mixture reaching chamber 100 is at a comparatively low temperature. On the other hand, the air issuing from annular space 103 is at a high temperature.

During the initial stage of slow downward movement of the piston within the cylinder, the flow of air through restricted space 107 is not greatly retarded, while during the subsequent stage on the other hand, where the velocity of piston movement is higher, the restriction exerts an appreciable retarding effect on the air flow. Hence, the cylinder is initially supplied with a relatively poor mixture, and thereafter with a richer carburized mixture.

According to one embodiment of the invention, illustrated by way of example in chain lines in Fig. 4, the central conduit 106 is extended by an appendage 130 extending angularly into combustion chamber 100 as far as a point adjacent the valve 101, for purposes previously described hereinabove.

Any liquid fuel droplets which may reach the extremity of pipe 106 along the side walls of the latter, impinge against the annular end wall defining the annular gap 114 and are drawn through the ports 115 by the fluid flowing through venturi 11, where they are effectively vaporized.

Adjustment of the axial position of bushing 110 makes it possible to control the relative amounts of fluid entering the cylinder through annular space 103 and central conduit 104. Such adjustment may be effected independently for each cylinder of a motor.

According to a modification, a pneumatic communication is established through a conduit 131 between the outlet of carburetor 122 and an appropriate point of the heated combustion air circuit, such as a point of the conduit 116. Such communication is desirably controlled by a throttle valve 132 actuable from the control panel of the vehicle. In this way the amount of carburized fluid entering conduit 104 may be regulated as desired. When the throttle 132 completely seals the communication 131, all of the carburized fluid entering the chamber 100 is drawn in from conduit 106 and the temperature of the mixture is a minimum. When however the communication 131 is open, the amount of carburized gas flowing through annular space 103 is a maximum. This gas is heated during its flow through conduit 105 and the temperature of the mixture entering the cylinder is consequently higher.

Reference is next made to Fig. 5 which relates to an embodiment of the invention similar to that just described, but applied to a six-cylinder motor. The intake chambers 201, 202, 203 are provided with the intake valves 204 to 209. Opening into each chamber is an induction tube, respectively $210_1$, $210_2$, $210_3$. The tubes serve to supply the motor with heated air from a collector 211 the flow section of which is controlled by a throttle valve 212 adjustable by means of a lever 214 through a shaft 213.

The chambers are further supplied with fluid flowing through conduits $220_1$, $220_2$, $220_3$, from a carburetor 221 arranged at the connection between conduits 220, and having a throttle 219 mounted on a shaft 213 and a float chamber indicated at 218.

The tubes 210 are secured in the conventional manner to the exhaust pipe so that the air flowing therethrough is heated. The conduits 220 on the other hand are not supported from the exhaust pipe, but instead are mounted in bosses $223_1$, $223_2$, $223_3$, of the tubes 210 and are secured thereto by a sealed connection. The conduits 220 have a substantial part of their length extending outside the tubes 210.

The outlet of each tube 210 is formed as an annular space, respectively $224_1$, $224_2$, $224_3$, defined as previously described by means of an outer venturi member 226 and an inner venturi member 227. Inner venturi member 227 is carried on a bushing 228 slidably mounted at the end of the conduit 220. This conduit is provided at its orifice with a venturi member 229 defining an annular space 230 and formed with ports 231. The bushing 228 may be slidably adjusted along the conduit 220 by means of a suitable adjusting device, such as a link 232 slidably mounted in a boss 223 and blockable in adjusted position by a set screw 233.

The arrangement just described is similar in operation to that described with reference to Fig. 4. The intake chambers and hence also the cylinders are supplied on the one hand with heated air through tubes 210, and on the other hand with cool carburized mixture through conduits 220.

During an induction period, in an initial phase, the cylinders are supplied with a relatively poor mixture and, in a second phase, they are supplied with a richer mixture.

A preferably adjustable communication may be provided between the heated air circuit and the carburized gas flow circuit.

Figs. 6 to 10 illustrate separately, in the case of four and six cylinder motors respectively, the conduit means (Figs. 6, 8 and 10) adapted for attachment to a motor in order to convert the latter into a motor according to the invention, and thereby considerably improve its performance, the conventional intake tube being replaced with a tube, such as shown in Figs. 7 and 9, provided with means adapted for cooperation with the said conduit means. It is of course to be understood that the arrangement of the said conduit means and tubes may actually vary within wide limits according to the different types of motor in connection with which they are to be used, without exceeding the scope of the invention.

The ambit of the invention further includes the use of such conduit devices for the supply to a motor of gaseous fuels such as acetylene.

In the conduit and tube systems of the types described above, the respective attributions of the flow circuits may differ from those specifically described. Thus, in the construction of Fig. 5, the intake pipe or tube may serve to convey the carburized gas mixture, while the conduit device having a part thereof extending outside said tube, may serve to conduct the air.

It is also contemplated according to the invention that the conduit device may be connected with the tube without extending into the interior thereof.

Referring now to Figs. 11 to 14, the unit or block 300 there shown is adapted to be interposed between a conventional carburetor and the internal combustion motor unit proper. The block is provided with a main cylindrical bore 301 adapted to register with the main conduit of the carburetor, and two substantially cylindrical further bores 302 and 303 extending parallel to each other and perpendicularly to bore 301, said bores 302 and 303 opening into the main bore 301 as clearly visible on the drawings. The bores extend right through the block and house valve members similar to that shown in Fig. 15. Each valve member 304 is of generally cylindrical form and comprises an operating shank 305 for imparting rotation thereto by suitable operating means not shown.

Part of the wall of the valve member is concave as at 306, defining a generally cylindrical surface the generatrices of which are normal to the axis of the valve member, so that, with the valve member in sealing position as shown in Figs. 11 and 12, the periphery of the conduit 301 is unaffected and remains perfectly cylindrical in shape.

The valve member is further formed with an aperture 397 of substantially elongated form adjacent to the arcuate portion 306 and substantially equal in length thereto, the width of the aperture being predetermined with regard to the unit rate of gas flow which it is desired to obtain in the branch conduit.

In the construction shown in Figs. 11 to 14, the gas issuing from the valve members issues therefrom through the open end 308 thereof, which connects with a conduit, whereas the opposite end 309 of the valve member is solid.

In a modified construction, the valve member is formed with apertures in its wall adapted to connect with conduits which need not necessarily extend in axial alignment with the valve members, in such a way as to be conveniently adaptable to various possible arrangements of the motors and supply means used.

In the condition shown in Figs. 11 and 12, the carburetor having the block 300 as an attachment thereto operates in a conventional manner, and the carburized gas follows the usual circuit. This may, for instance, be the initial condition of the motor when starting cold.

As the general temperature of the motor gradually increases, and it being desired to prevent a corresponding rise in the temperature of the induction gases, the valve members 302 and 303 are rotated in opposite directions, such rotation being effected either manually or through thermostatically operating means, in order to bring said members to a position such as that shown in Figs. 13 and 14. In this setting, part of the gases circulating in the upstream portion 301a of conduit 301 is withdrawn through the conduits 309 and 310 formed by the valve members, flows through the tubes extending outside the intake pipe, and is conveyed to the cylinders at a sufficiently low temperature to ensure that the motor will retain its optimum efficiency.

Reference will now be had to Figs. 16 and 17 relating to a carburetor. The carburetor comprises the conventional jet 320 arranged in the restricted throat section of a venturi 321, as well as a throttle valve 322; however, instead of having only a single outlet as shown at 323, it is provided with a number of additional outlets, two in the example shown, adapted to convey a controllable proportion of the carburized gas through a tube partly or wholly independent of the general intake pipe. In the construction shown, both outlets 324 and 325 are formed in bosses 326 and 327 formed in the carburetor body 328, the inlet to each of conduits 324 and 325 being controlled with a rotatable valve member 329 and 330 respectively. These valve members have advantageously a structure similar to that of Fig. 15. In this construction however, the valve member in addition to the aperture 331 opening into the general conduit 332 of the carburetor is formed with a further aperture 333 extending over a sufficient width to ensure that the aperture 333 will at all times lie within the conduit 334 whenever the aperture 331 has carburized gas flowing through it.

The setting shown in Fig. 16 is that for which a maximum proportion of carburized gas is withdrawn and conveyed to the motor over conduits having considerable thermal isolation with respect to the exhaust. This setting will, for example, correspond to the steady or "cruising" output of the motor.

In Fig. 17 that setting is illustrated in which the carburetor operates in the conventional way, the whole of the carburized gas being delivered to the motor cylinders through the conventional intake pipe.

Fig. 18 relates to an intake pipe according to the invention adapted for attachment to a carburetor of conventional type. The intake pipe 340 is formed with an inlet opening 341 provided with a flange 342 adapted to be secured to the conventional carburetor. The main conduit 343 may be divided, as shown, into two branches 344 and 345 in the usual manner. Moreover, the pipe is formed with two ducts 346 and 347 provided in the bosses 348 and 349 and the inner ends of which are controlled by valves 350 and 351 respectively, for a similar purpose as that previously described hereinabove. Fig. 18 shows the valves adjusted to the setting providing for maximum proportion of withdrawn gas.

It is also contemplated according to the present invention to place the means for adjusting the gas flow withdrawn into the auxiliary circuit, under control of the actuating means conventionally provided for the purpose of facilitating priming of the motor when cold, and known as the "choker." In such a design, operation of the choker, whether manual or automatical, is arranged to render the means described hereinabove inoperative, so that the motor is then supplied in the ordinary way and starts easily, whereas displacement of the choker control to its inoperative position reenables the improved supply means according to the invention.

What we claim is:

1. Apparatus for supplying combustible mixture to an internal combustion cylinder engine comprising an intake manifold fixed to the engine in good heat conducting relationship therewith and opening into the cylinders, a device for producing a combustible mixture communicating with the manifold, heat-insulating means positioned between the manifold and said device, and by-pass means having one end communicating with said device upstream of said heat-insulating means and another end opening into the manifold at the end thereof adjacent the engine cylinders.

2. Apparatus as in claim 1 wherein the cross-section of flow of the by-pass means is small relatively to that of the manifold.

3. In apparatus for supplying combustible mixture from a carburetor to an engine, first duct means establishing a communication between the carburetor and the engine and supported on the engine in good heat-conducting relationship therewith, and second duct means establishing a communication between the carburetor and the engine and supported on the engine in bad heat-conducting relationship therewith.

4. In apparatus as in claim 3, valve means controlling the cross-section of flow of said second means, and actuating means for said valve means.

5. In apparatus as in claim 4, means for actuating said valve means to closed position for starting the engine.

6. A device for improving apparatus producing a combustible charge in an internal combustion engine having a carburetor and an intake manifold fixed to the engine, said device comprising a block for mounting between the carburetor and manifold and defining a passage therebetween, means for heat-insulating the block from the manifold, by-pass duct means supported by the block having a small cross-section of flow relatively to that of the manifold and opening at one end into said passage, and means connecting the other end of said by-pass means to the ends of the manifold adjacent the engine.

7. Apparatus as in claim 1 wherein the by-pass means comprise a venturi positioned between the device for producing a combustible mixture and the manifold, and ducts extending from the narrowest point of said venturi at right angles to the axis thereof.

8. In apparatus as in claim 3, adjustable throttle means positioned within said second duct means adjacent the end thereof communicating with said device.

9. Apparatus as in claim 8 wherein said adjustable throttle means comprise a cylindrical barrel member extending in closed position in the prolongation of said first duct means.

10. Apparatus as in claim 9 wherein said second duct means extend in the prolongation of said barrel member in alinement therewith.

11. Apparatus as in claim 9 wherein said second duct means extend in the prolongation of said barrel member transversely thereof.

References Cited in the file of this patent

UNITED STATES PATENTS

| | | |
|---|---|---|
| 1,911,135 | Aseltine | May 23, 1933 |
| 1,937,938 | Aseltine et al. | Dec. 5, 1933 |
| 2,011,992 | Aseltine | Aug. 20, 1935 |